United States Patent
Sakai et al.

[11] Patent Number: 5,899,306
[45] Date of Patent: May 4, 1999

[54] DRIVE FORCE TRANSMISSION APPARATUS

[75] Inventors: Naoyuki Sakai, Anjo; Hiroshi Takuno, Aichi-ken; Yoshiaki Senga, Kariya; Kunihiko Suzuki, Gamagoori; Naoyuki Kokubo, Aichi-ken; Tsuyoshi Murakami, Handa; Mikiharu Oyabu, Kariya; Satoshi Ashida, Toyota; Kenji Arai, Toyota; Hisashi Fukuchi, Toyota; Akio Mukainaka, Toyota, all of Japan

[73] Assignees: Toyoda Koki Kabushiki Kaisha, Kariya; Toyota Jidosha Kabushiki Kaisha, Toyota, both of Japan

[21] Appl. No.: 08/966,244

[22] Filed: Nov. 7, 1997

[30] Foreign Application Priority Data

Nov. 7, 1996 [JP] Japan .................................. 8-295467
Nov. 8, 1996 [JP] Japan .................................. 8-295567

[51] Int. Cl.$^6$ ........................................... F16D 43/284
[52] U.S. Cl. ................... 192/35; 192/57; 192/85 AA; 192/103 F
[58] Field of Search .............................. 192/35, 54.3, 57, 192/85 AA, 103 F

[56] References Cited

U.S. PATENT DOCUMENTS

| | | |
|---|---|---|
| 4,905,808 | 3/1990 | Tomita et al. . |
| 4,966,268 | 10/1990 | Asano et al. . |
| 5,178,249 | 1/1993 | Haga et al. . |
| 5,454,457 | 10/1995 | Sakai et al. .............................. 192/35 |
| 5,526,912 | 6/1996 | Gassmann . |
| 5,690,201 | 11/1997 | Gassmann ................................ 192/35 |
| 5,706,923 | 1/1998 | Gassmann ................................ 192/57 |

FOREIGN PATENT DOCUMENTS 64-6526   1/1989   Japan .
2-203026  8/1990   Japan .
4-151028  5/1992   Japan .

OTHER PUBLICATIONS

Patent Abstracts of Japan, vol. 95, No. 5, Jun. 30, 1995, JP 07 035171, Feb. 3, 1995.

Patent Abstracts of Japan, vol. 14, No. 347 (M–1002), Jul. 26, 1990, JP 02 120529, May 8, 1990.

*Primary Examiner*—Richard M. Lorence
*Attorney, Agent, or Firm*—Oblon, Spivak, McClelland, Maier & Neustadt, P.C.

[57] ABSTRACT

A drive force transmission apparatus includes a housing connected to one of two shafts that are rotatable relative to each other, a rotary shaft rotatably supported by the housing and connected to the other shaft, and a multiple disc clutch composed of a plurality of outer plates engaged with the housing in the rotational direction and a plurality of inner plates engaged with the rotary shaft in the rotational direction. The multiple disc clutch transmits rotational torque between the housing and the rotary shaft through frictional engagement between the outer plates and the inner plates. The apparatus also includes a pressure generation mechanism for generating a pressure corresponding to a rotational-speed difference between the housing and the rotary shaft and for applying the generated force to the multiple disc clutch via a piston. The pressure generating means is composed of a plurality of rotary blades accommodated within a cylindrical space formed between the piston and the housing and rotating together with the rotary shaft, a viscous fluid charged into a plurality of pressure chambers defined by the housing, the piston, and the rotary blades, and a free blade accommodated within at least one pressure chamber. The free blade is freely movable in the circumferential direction between the rotary blades.

8 Claims, 12 Drawing Sheets

DRIVE FORCE TRANSMISSION APPARATUS

BACKGROUND OF THE INVENTION

1. Field of the Invention

The present invention relates to a drive force transmission apparatus disposed between two shafts that are rotatable relative to each other and adapted to transmit rotational torque therebetween.

2. Description of the Related Art

In a conventional drive force transmission apparatus used for four-wheel drive and adapted to transmit torque between front wheels and rear wheels, when an accelerator pedal is depressed and released during a turn on a low-$\mu$ road, there occurs a phenomenon in which the direction of differential rotation (relative rotation) between the front wheels and the rear wheels reverses.

In order to reduce the size and weight of such a drive force transmission apparatus, there has been proposed a drive force transmission apparatus in which a space filled with a viscous fluid is provided on a side of a piston that presses a multiple disc clutch for torque transmission, and blades are rotatably disposed within the space in order to generate a pressure corresponding to a rotational-speed difference between an input shaft and an output shaft.

In the drive force transmission apparatus, when a rotational-speed difference is produced between the front wheels and the rear wheels, the blades rotate relative to the housing and forcibly move the viscous fluid between two surfaces in close proximity to each other in order to generate a pressure corresponding to the rotational-speed difference by means of the viscous friction effect of the viscous fluid. This pressure acts on the piston so that the multiple disc clutch is brought into a frictional engagement state in order to establish four-wheel drive.

In such a drive force transmission apparatus, since two or three blades are disposed in the circumferential direction such that they project outward in the radial direction, the angle between adjacent blades (inter-blade angel) is large, and therefore the flow range of the viscous fluid is large. Thus, a higher pressure can be generated in response to relative rotation.

However, when the inter-blade angle increases, air contained in the viscous fluid moves within a larger area, with the result that the response speed decreases to some extent when the direction of relative rotation changes.

The response can be improved by a method in which the number of the blades is increased in order to reduce the inter-blade angle, or by a method in which the amount of air mixed into the viscous fluid is reduced to increase the volume ratio between the filled viscous fluid and the space. However, in the former method, the pressure generated in response to relative rotation decreases, and therefore a required torque cannot be transmitted. In the latter method, transmission torque becomes excessively large because of the volume expansion of the viscous fluid stemming from a temperature rise.

SUMMARY OF THE INVENTION

The present invention has been accomplished to solve the above-mentioned problems and a main object of the present invention is to provide a drive force transmission apparatus which has sufficient responsiveness even when the direction of relative rotation reverses.

It is another object of the present invention to improve the compatibility with an antilock braking system (ABS).

In order to achieve the above main object, the present invention provides a drive force transmission apparatus which includes a housing connected to one of two shafts that are rotatable relative to each other; a rotary shaft rotatably supported by the housing and connected to the other shaft; a multiple disc clutch composed of a plurality of outer plates engaged with the housing in the rotational direction and a plurality of inner plates engaged with the rotary shaft in the rotational direction, the multiple disc clutch transmitting rotational torque between the housing and the rotary shaft through frictional engagement between the outer plates and the inner plates; and pressure generation means for generating a pressure corresponding to a rotational-speed difference between the housing and the rotary shaft and for applying the generated force to the multiple disc clutch via a piston, wherein the pressure generating means is composed of a plurality of rotary blades accommodated within a cylindrical space formed between the piston and the housing, the blades arranged in the circumferential direction and rotating together with the rotary shaft; a viscous fluid charged into a plurality of pressure chambers defined by the housing, the piston, and the rotary blades; and a free blade accommodated within at least one pressure chamber, the free blade being freely movable in the circumferential direction between the rotary blades.

In the drive force transmission apparatus of the present invention, when the direction of relative rotation reverses, the free blade moves relative to the rotary blades, so that the volume of the pressure chamber is decreased and the pressure generated therein is increased. This pressure increase compensates a decrease in the internal pressure of the pressure chamber, which decrease would otherwise occur due to behavior of air contained in the viscous fluid when the direction of relative rotation reverses. Accordingly, the drive torque transmission apparatus of the present invention has sufficient responsiveness even when the direction of relative rotation reverses.

In order to achieve said another object, a stepped portion is formed at least at one end of each rotary blade in the rotational direction and one end of the free blade in the rotational direction.

In this case, since the pressure generated in the pressure chamber changes with the direction of relative rotation, the compatibility with the ABS can be improved.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will now be described in detail with reference to the drawings.

First Embodiment

Figure 1:
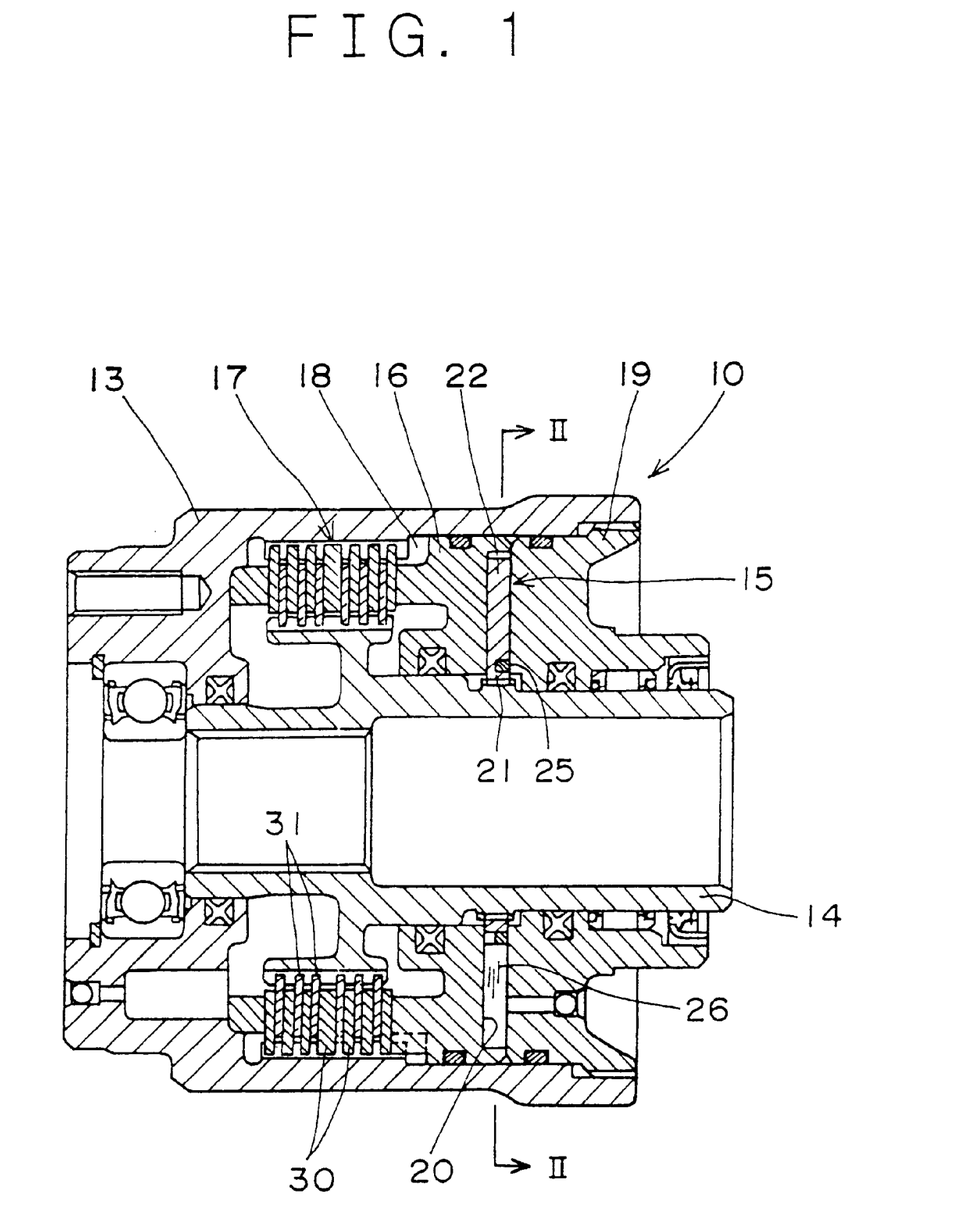
FIG. 1 is a sectional view showing a drive force transmission apparatus according to a first embodiment of the present invention.

FIG. 1 shows a drive force transmission apparatus 10 to be disposed between two shafts (front and rear wheel-shafts) that are rotatable relative to each other. The drive force transmission apparatus 10 is mainly composed of a front housing 13, a rotary shaft 14 which penetrates the housing 13 and is rotatably supported thereby, pressure generation means 15 for generating a pressure in response to relative rotation between the housing 13 and the rotary shaft 14, a piston 16 to which the pressure generated by the pressure generation means 15 acts, and a multiple disc clutch 17 which is brought into a frictional engagement state by the pressing force imparted by the piston 16.

One of the above-described two shafts is connected to one end of the housing 13, while the other shaft is inserted into the rotary shaft 14 and spline-engaged therewith. A cylindrical hole 18 having a bottom is formed from the other end of the housing 13, and the multiple disc clutch 17 is accommodated within the cylindrical hole 18. The piston 16 for pressing the multiple disc clutch 17 is slidably accommodated within the cylindrical hole 18, and the open end of the cylindrical hole 18 is closed by a rear housing 19 screwed into the front housing 13. The piston 16 is engaged with a spline formed on the inner circumference of the front housing 13, so that the piston 16 is prevented from rotating relative to the front housing 13.

At one end of the piston 16 that faces the rear housing 19, a cylindrical space 20 having a limited axial dimension is formed concentrically with the rotary shaft 14. Within the cylindrical space 20 is rotatably accommodated a rotor 21, whose center portion is spline-engaged with the outer circumference of the rotary shaft 14. The rotor 21 has a plurality of rotary blades 22 which are arranged at constant angular intervals in the circumferential direction and project in the radial direction. Each of the rotary blades 22 has a thickness slightly smaller than the axial dimension of the space 20. The rotary blades 22 divide the space 20 into a plurality of pressure chambers 23.

A free rotor 25 is fitted into the rotor 21 concentrically therewith such that the free rotor 25 is allowed to rotate relative to the rotor 21. A plurality of free blades 26 are outwardly projected from the free rotor 25. The number of the free blades 26 is the same as the number of the rotary blades 22, and the thickness of the free blades 26 is the same as that of the rotary blades 22. The free blades 26 can move freely between the rotary blades 22 within the pressure chambers 23. The pressure chambers 23 is filled with a viscous fluid 27 at a predetermined filling ratio.

A small clearance (top clearance) 28 is formed between the distal end of each rotary blade 22 and the inner circumference of the cylindrical space 20, so that the viscous fluid 27 flows restrictedly between the pressure chambers located on opposite sides of each rotary blade 22 in the circumferential direction. The clearance 28 may be formed as a side clearance on either axial side of each rotary blade 22.

The flow of the viscous fluid 27 through the clearance 28 allows the free blades 26 to move relative to the rotary blades 22, so that the volumes of the pressure chambers 23 between the rotary blades 22 and the free blades 26 changes with relative movement therebetween.

Therefore, when the rotary shaft 14 rotates relative to the housing 13 due to relative rotation between the above-described two shafts, the viscous fluid 27 in the plurality of pressure chambers 23 is forcibly moved by the rotary blades 22 and the free blades 26 between the two opposed surfaces at a speed corresponding to the rotational-speed difference. As a result, an internal pressure proportional to the rotational-speed difference is generated within the pressure chamber 23. At this time, if a speed difference is produced between the rotary blades 22 and the free blades 26, the volumes of the pressure chambers 23 filled with the viscous fluid 27 change, so that the internal pressures of the pressure chambers 23 increase.

The above-described rotary blades 22, the free blades 26, and the viscous fluid 27, all accommodated within the space 20, constitute the above-described pressure generation means 15.

The multiple disc clutch 17 accommodated within the cylindrical hole 18 is composed of a plurality of outer plates (separate plates) 30 and a plurality of inner plates (friction plates) 31, which are disposed alternately in the axial direction. The outer circumferences of the outer plates 30 are in spline-engagement with the inner circumferential surface of the housing 13, while the inner circumferences of the inner plates 31 are in spline-engagement with the outer circumferential surface of the rotary shaft 14.

Next, the operation of the drive force transmission apparatus having the above-described structure will be described.

Figure 2:
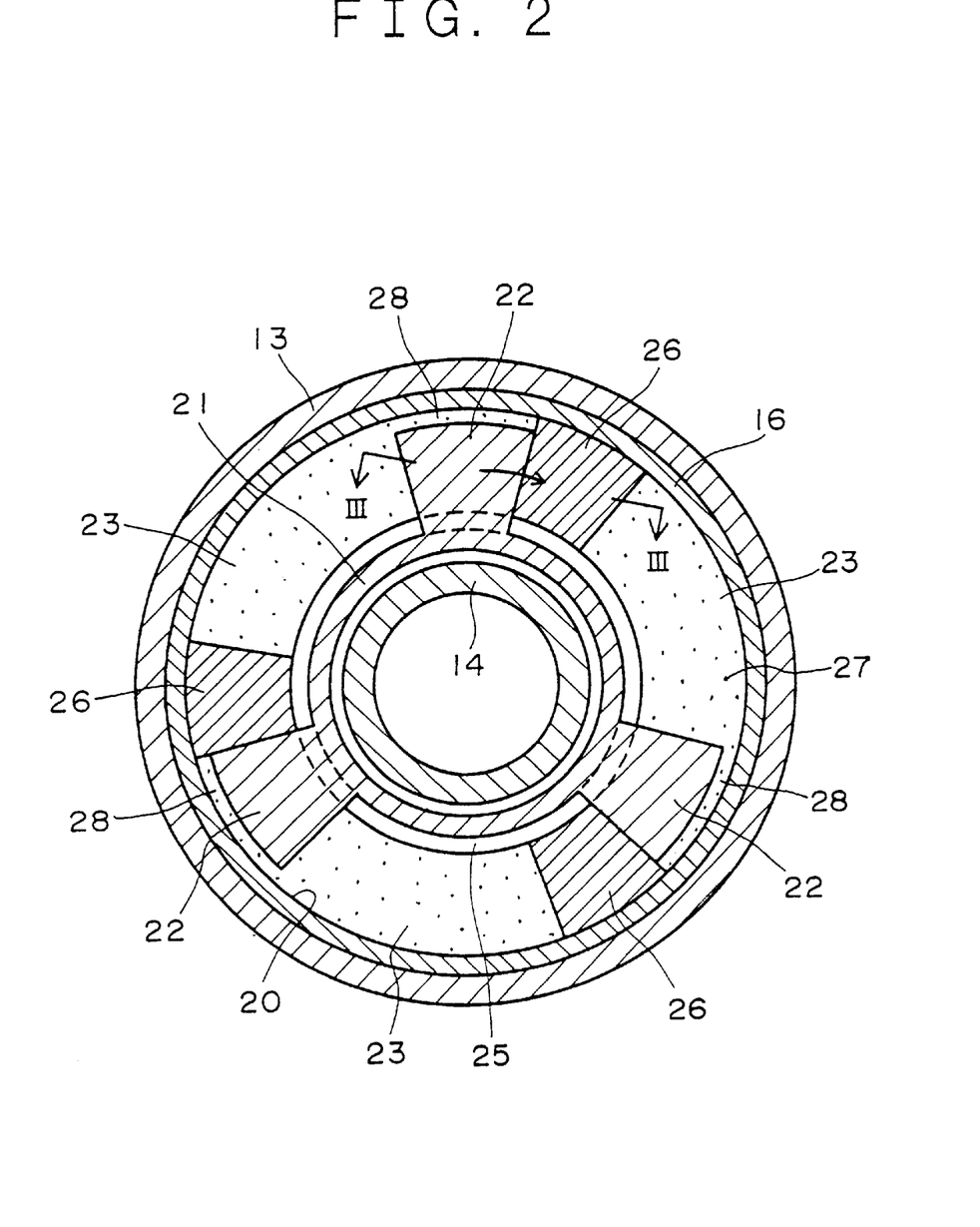
FIG. 2 is a sectional view taken along line II—II of FIG. 1.
Figure 3:
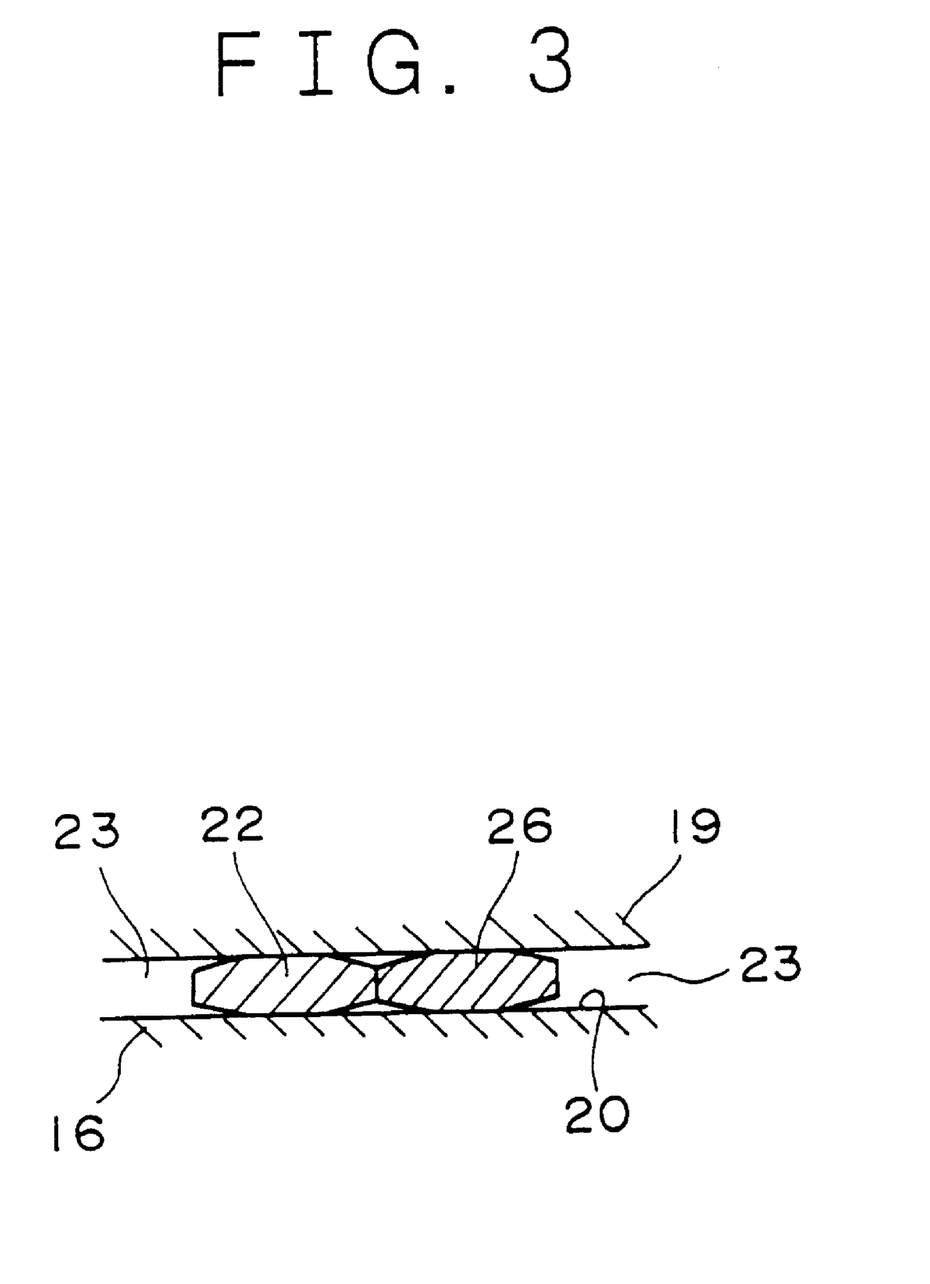
FIG. 3 is a sectional view taken along line III—III of FIG. 2.

In an ordinary state, the free blades 26 are rotated in the rotational direction of the rotary shaft 14 by the rotary blades 22, so that the free blades 26 rotate together with the rotary blades 22, as shown in FIGS. 2 and 3.

When a relative rotation is produced between the two shafts, the rotary blades 22 and the rotary shaft 14 rotate in the direction of the arrow in FIG. 2 relative to the housing 13. As a result, the viscous fluid 27 in the plurality of pressure chambers 23 is forcibly moved by the free blades 26 between the two opposed surfaces at a speed corresponding to the rotational-speed difference, so that an internal pressure proportional to the rotational-speed difference is generated within each pressure chamber 23 due to the viscous friction effect of the viscous fluid 27. That is, there is generated an internal pressure having a pressure profile such that a high pressure is generated at the upstream side of the flow of the viscous fluid 27 between the two surface, while a low pressure is generated at the downstream side thereof. Due to this internal pressure, the piston 16 is moved toward the multiple disc clutch 17.

Thus, the plurality of outer plates 30 and the plurality of inner plates 31 of the multiple disc clutch 17 are frictionally engaged with each other with a pressing force corresponding to the pressure acting on the piston 16, so that torque is transmitted between the housing 13 and the rotary shaft 14, i.e., between the front and rear wheel-shafts, via the multiple disc clutch 17. In this way, the vehicle is brought into a four-wheel drive state.

When an accelerator pedal is released from the depressed state during a turn on a low-$\mu$ road, the direction of relative rotation between the housing 13 and the rotary shaft 14 reverses, the rotary blades 22 and the free blades 26 rotate relative to the housing 13 in the direction opposite to the direction of the arrow in FIG. 2, so that an internal pressure proportional to the rotational-speed difference is generated within each pressure chamber 23 due to the viscous friction effect of the viscous fluid 27 which is forcibly moved between the two opposed surfaces.

Figure 5:
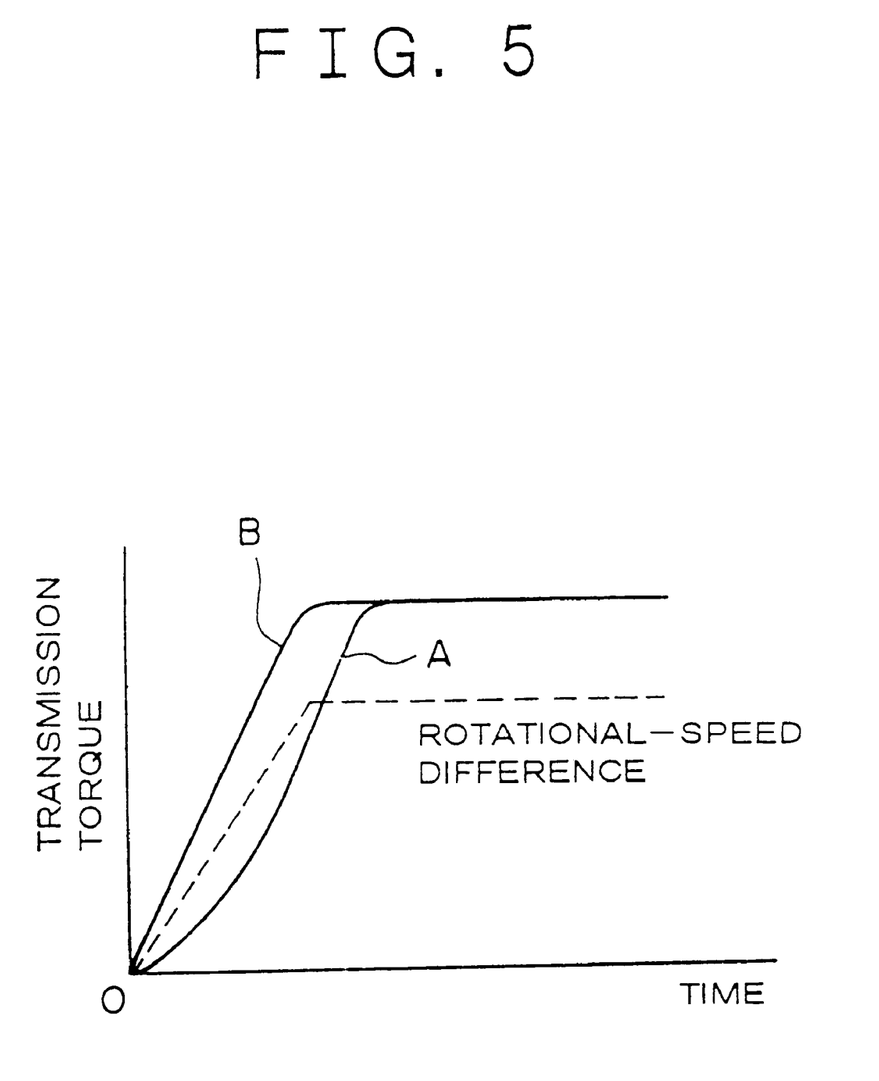
FIG. 5 is a graph showing torque transmission characteristics of the drive force transmission apparatus according to the first embodiment.

When the direction of rotation of the rotary shaft 14 relative to the housing 13 reverses, the internal pressure generated in the pressure chamber 23 due to flow of the viscous fluid 27 decreases to some extent while the air mixed in the viscous fluid 27 moves within the pressure chamber 23 in accordance with the pressure profile generated in the pressure chamber 23. Accordingly, in a conventional drive force transmission apparatus, rising of torque with an initial increase in the rotational-speed difference (illustrated by the broken line in FIG. 5) becomes dull as indicated by the solid line A in FIG. 5.

Figure 4:
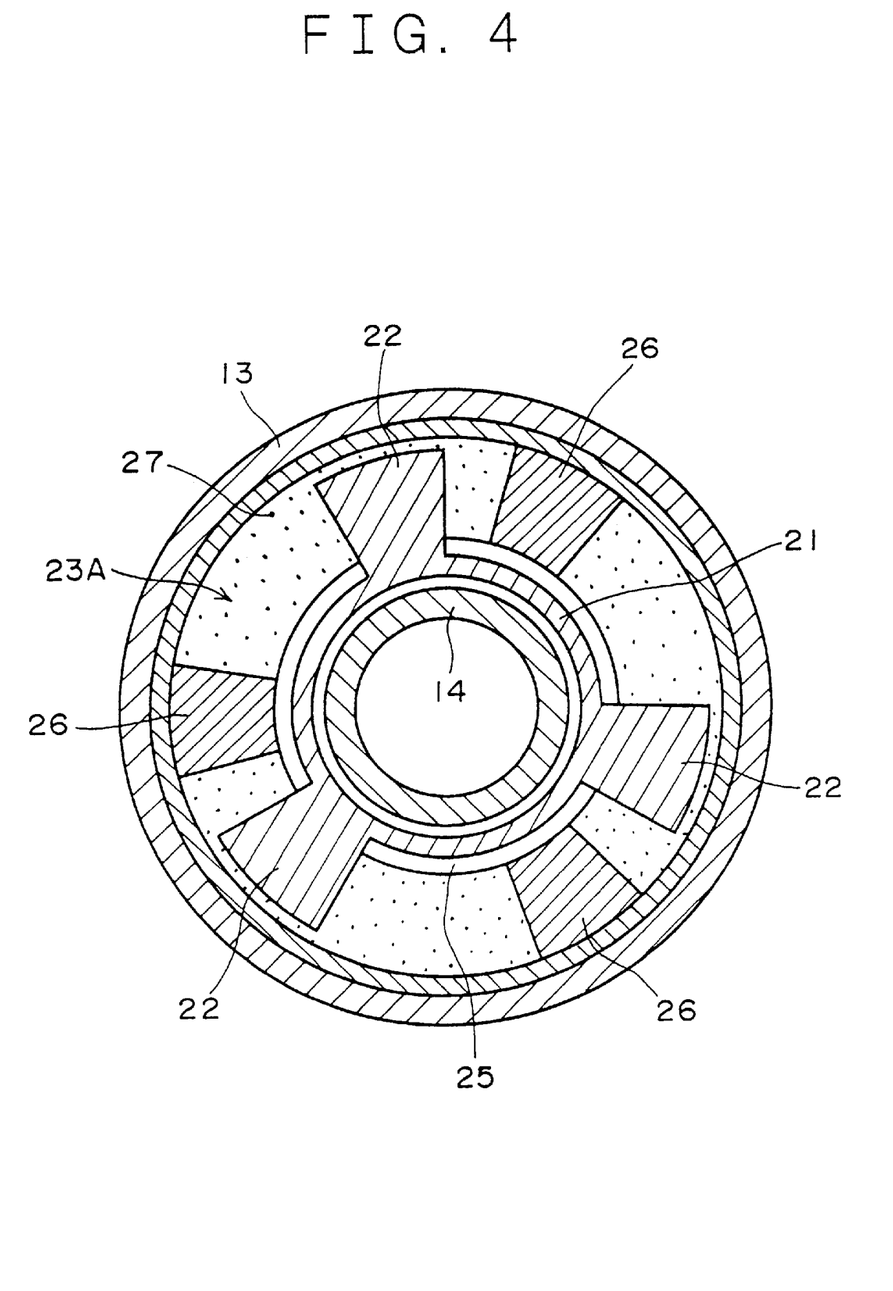
FIG. 4 is a sectional view showing an operating state of the drive force transmission apparatus according to the first embodiment.

However, in the present embodiment, when the direction of rotation of the rotary shaft 14 relative to the housing 13 reverses, a speed difference is produced between the rotary blades 22 and the free blades 26 due to the effect of inertia, so that the free blades 26 move apart from the rotary blades 22, as shown in FIG. 4. As a result, the volumes of the pressure chambers 23 formed between the rotary blades 22 and the free blades 26 decrease, with the result that the internal pressures of the pressure chambers 23 increase in accordance with variations in the volumes.

Accordingly, while air mixed in the viscous fluid 27 moves within the pressure chambers 23, the reduction of the internal pressure of the pressure chambers 23 caused by the flow of the viscous fluid 27 is compensated through the reduction of the volumes of the pressure chambers 23, which occurs due to the speed difference between the rotary blades 22 and the free blades 26. Thus, rising of torque with an initial increase in the rotational-speed difference becomes steep as indicated by the solid line B in FIG. 5, so that the responsiveness during reversion of the direction of relative rotation can be improved.

When the reversed relative rotation between the housing 13 and the rotary shaft 14 continues, the rotary blades 22 abut the free blades 26, so that the free blades 26 starts integral rotation with the rotary blades 22. Thus, the drive force transmission apparatus returns to the ordinary state in which an internal pressure proportional to the rotational-speed difference is generated within each pressure chamber 23 due to the viscous friction effect of the viscous fluid 27 caused by the relative rotation between the housing 13 and the rotary shaft 14.

In the above-described drive force transmission apparatus, when the direction of rotation of the rotary shaft 14 relative to the housing 13 reverses, the volumes of the pressure chambers 23 decrease due to relative movement between the rotary blade 22 and the additionally provided free blades 26, so that the pressures within the pressure chambers 23 increase.

Accordingly, when the direction of relative rotation reverses, a pressure is generated due to the viscous friction of the viscous fluid 27 caused by the relative rotation between the housing 13 and the rotary shaft 14, and the thus-generated pressure is increased by the relative movement of the free blades 26 with respect to the rotary blades 22. Thus, the responsiveness during reversion of the relative rotation can be improved.

In addition, since the angle of the pressure chambers 23 between the blades are maintained large through integral rotation of the rotary blades 22 and the free blades 26, a larger pressure can be generated in response to relative rotation. Thus, it becomes possible to reliably transmit torque between the two shafts.

Second Embodiment

Figure 6:
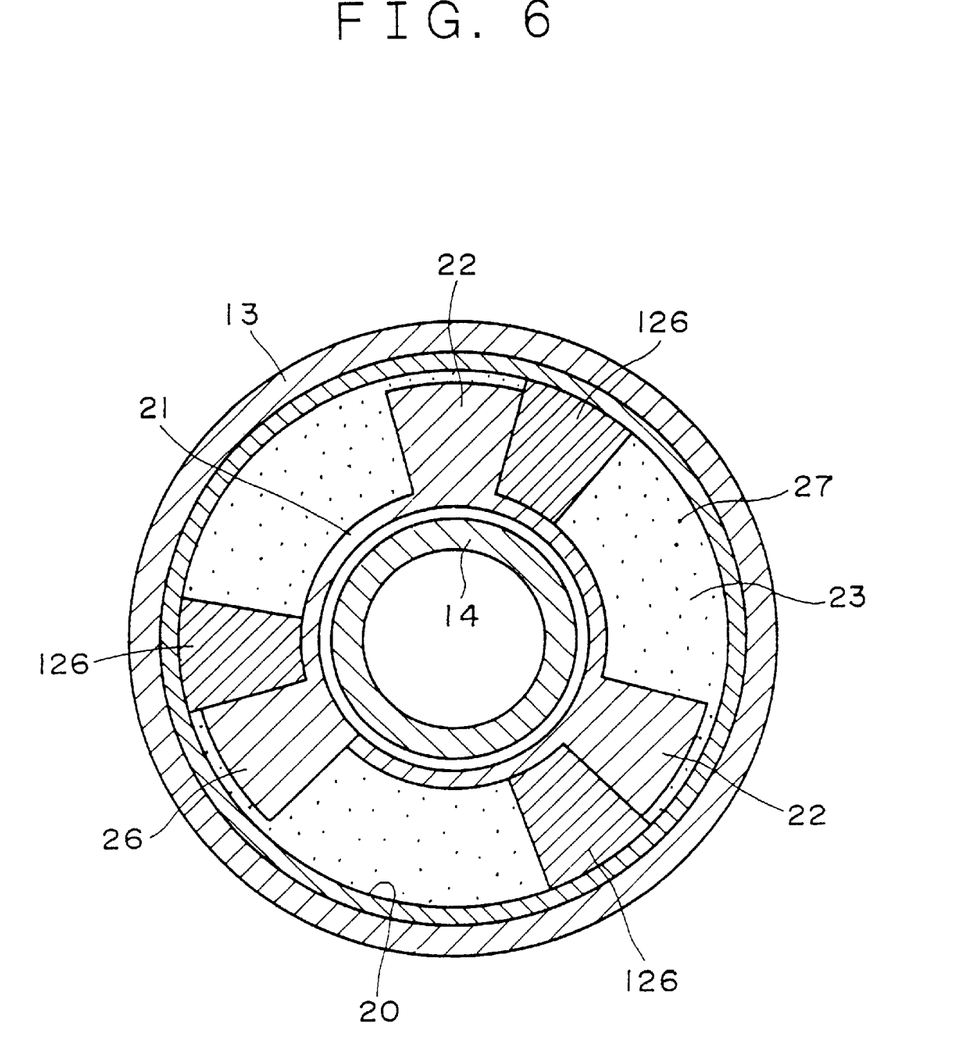
FIG. 6 is a sectional view showing a drive force transmission apparatus according to a second embodiment of the present invention.

A drive force transmission apparatus according to a second embodiment of the present invention will be described with reference to FIG. 6.

In the present embodiment, a plurality of independent or separated free blades 126 are movably disposed in the pressure chambers 23 between the rotary blades 22. Specifically, the inner end of each free blade 126 is guided by the outer circumferential surface of the rotor 21 and the outer end of each free blade 126 is guided by the inner circumferential surface of the cylindrical space 20 for free sliding movement within the corresponding pressure chamber 23. Thus, the drive force transmission apparatus according to the present embodiment operates in the same way as that of the first embodiment. In this case, if a circular plate is used as the free blade 126, the sliding resistance of the free blades 126 can be reduced.

In the above-described first and second embodiments, the front housing 13, the multiple disc clutch 17, the piston 16, the space 20, and the rear housing 19 are arranged in this sequence in the drive force transmission apparatus. However, the reversed arrange may be employed. That is, the drive force transmission apparatus may be constructed such that the front housing 13, the space 20, the piston 16, the multiple disc clutch 17, and the rear housing 19 are disposed in this sequence.

Third Embodiment

A drive force transmission apparatus according to a third embodiment of the present invention will be described with reference to FIGS. 7–11. The drive force transmission apparatus of the present embodiment is substantially the same as that of the first embodiment except that each of the rotary blades 22 and the free blades 26 has a stepped portion (i.e., thin-thickness portions) at either end thereof in the rotational direction. Since the basic structure of the drive force transmission apparatus of the present embodiment is the same as that of the first embodiment, components identical to those in the first embodiment are denoted by the same reference numerals and descriptions therefor will be omitted.

Figure 7:
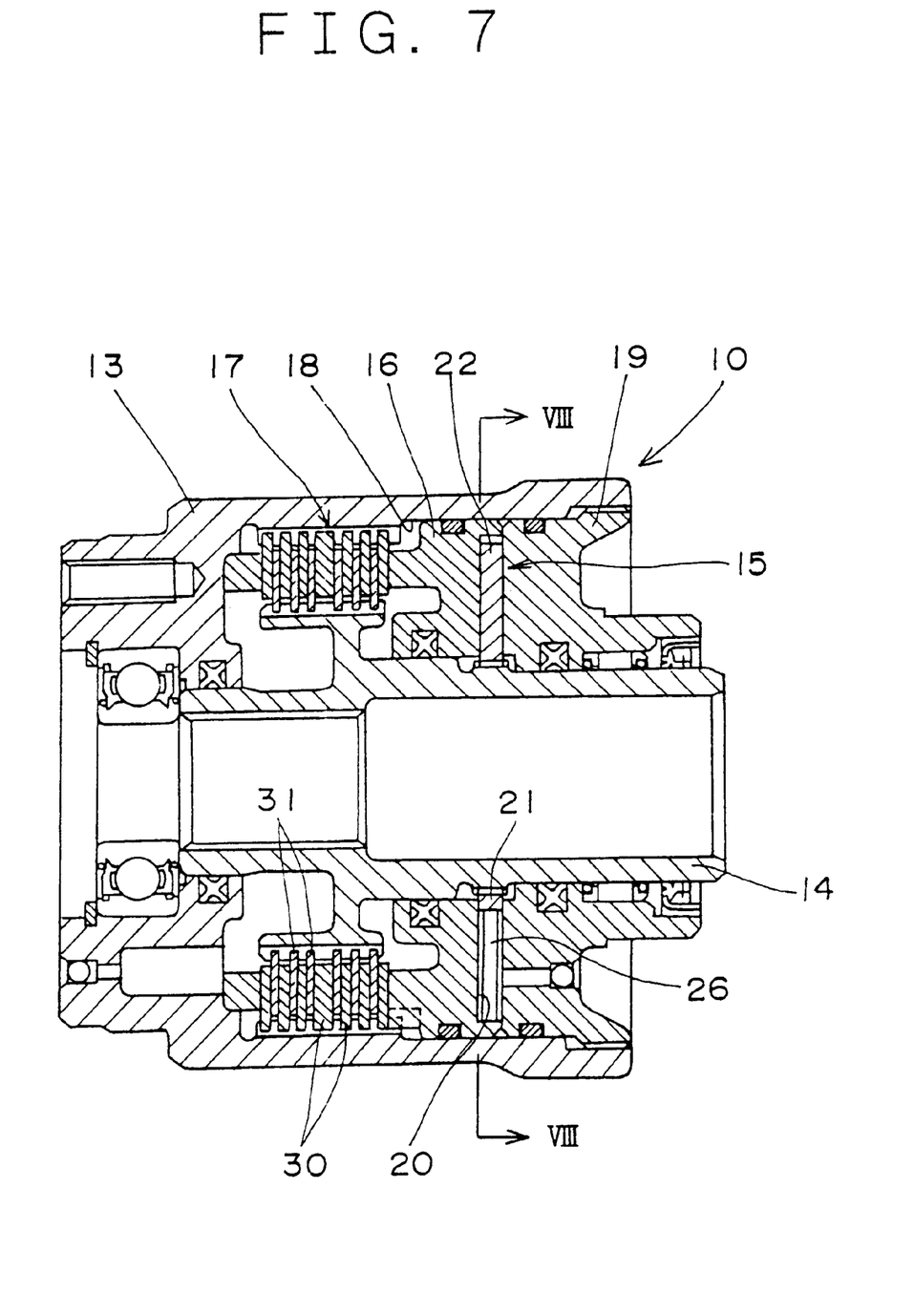
FIG. 7 is a sectional view showing a drive force transmission apparatus according to a third embodiment of the present invention.
Figure 8:
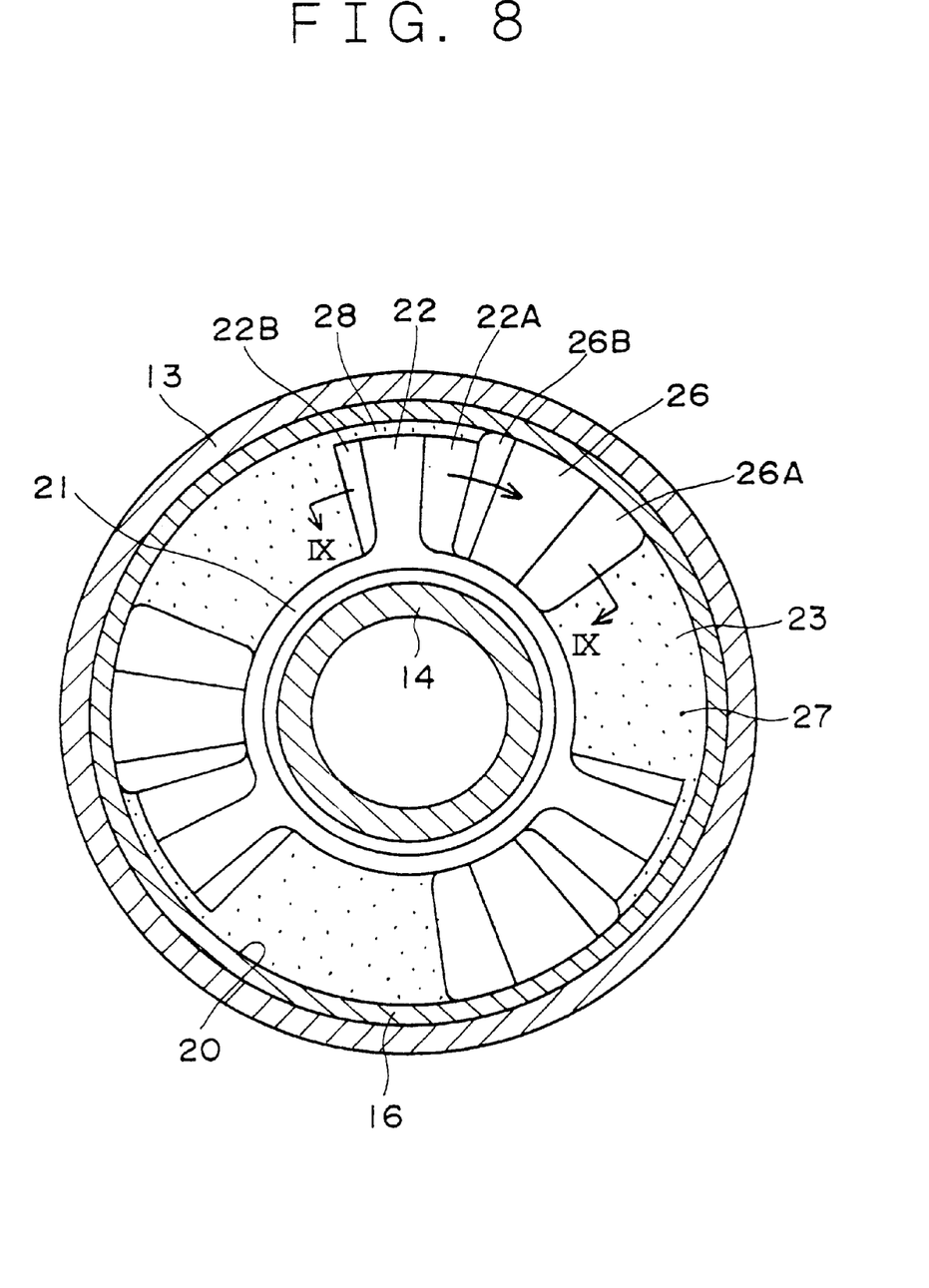
FIG. 8 is a sectional view taken along line VIII—VIII of FIG. 7.
Figure 9:
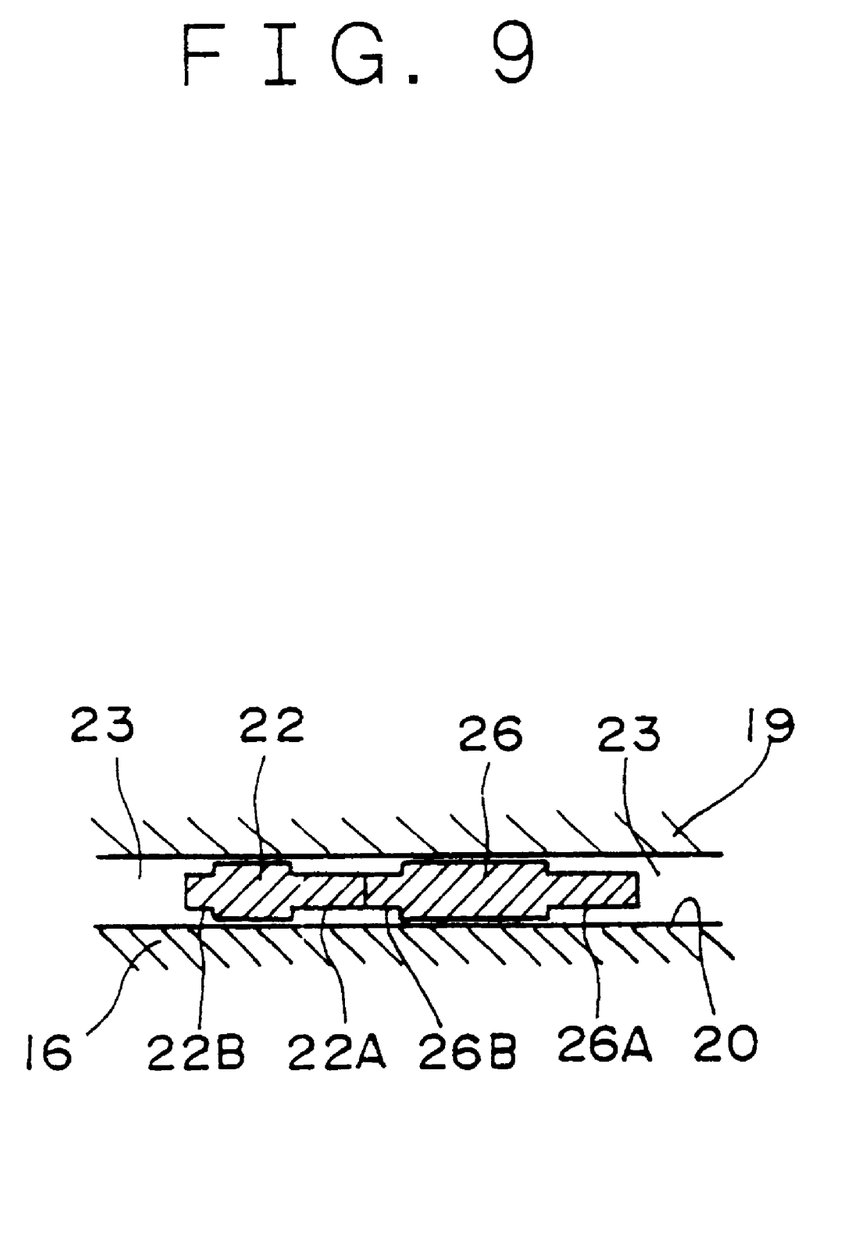
FIG. 9 is a sectional view taken along line IX—IX of FIG. 8.

As shown in FIGS. 7–9, stepped portions 22A and 22B each having a smaller thickness are formed at opposite ends of each rotary blade 22 in the rotational direction, and stepped portions 26A and 26B each having a smaller thickness are formed at opposite ends of each free blade 26 in the rotational direction. The stepped portions 22A and 22B of the rotary blades 22 are formed asymmetrically such that the stepped portions 22A located on the forward-rotation side of the rotary blades 22 have a larger dimension in the rotational direction than do the stepped portions 22B located on the reverse-rotation side thereof. Similarly, the stepped portions 26A and 26B of the free blades 26 are formed asymmetrically such that the stepped portions 26A located on the forward-rotation side of the free blades 26 have a larger dimension in the rotational direction than do the stepped portions 22B located on the reverse-rotation side thereof.

Next, the operation of the drive force transmission apparatus having the above-described structure will be described.

In an ordinary state, the free blades 26 are rotated in the rotational direction of the rotary shaft 14 by the rotary blades 22, so that the free blades 26 rotate together with the rotary blades 22, as shown in FIGS. 8 and 9.

When a relative rotation is produced between the two shafts due to racing of wheels, the rotary blades 22 and the rotary shaft 14 rotate in the direction of the arrow in FIG. 8 (forward direction) relative to the housing 13. As a result, the viscous fluid 27 in the plurality of pressure chambers 23 is forcibly moved by the free blades 26 between the two opposed surfaces at a speed corresponding to the rotational-speed difference, so that an internal pressure proportional to the rotational-speed difference is generated within each pressure chamber 23 due to the viscous friction effect of the viscous fluid 27. That is, there is generated an internal pressure having a pressure profile such that a high pressure is generated at the upstream side of the flow of the viscous fluid 27 between the two surface, while a low pressure is generated at the downstream side thereof. Due to this internal pressure, the piston 16 is moved toward the multiple disc clutch 17. At this time, since the viscous fluid 27 flows from one side of each free blade 26 where the longer stepped portion 26A is formed to the other side thereof, the pressure generated due to the relative rotation is increased by the action of the stepped portions 26A.

Thus, the plurality of outer plates 30 and the plurality of inner plates 31 of the multiple disc clutch 17 are frictionally engaged with each other with a pressing force corresponding to the pressure acting on the piston 16, so that torque is transmitted between the housing 13 and the rotary shaft 14, i.e., between the front and rear wheel-shafts, via the multiple disc clutch 17. In this way, the vehicle is brought into a four-wheel drive state.

When a relative rotation in the direction opposite to that in the above-described case is produced, the rotary blades 22 and the rotary shaft 14 rotate in the direction opposite to the direction of the arrow in FIG. 8 (reverse direction) relative to the housing 13, so that an internal pressure proportional to the rotational-speed difference is generated within each pressure chamber 23 in the same manner as that of the above-described case. However, in this case, the viscous fluid flows from one side of each free blade 26 where the shorter stepped portion 26B is formed to the other side thereof, so that the influence of the stepped portions 26B does not appear. As a result, a lower pressure is generated in response to the relative rotation, and torque transmission between the front and rear wheel-shafts is thus restricted.

Since the torque transmitted during the reverse relative rotation is set smaller than that during the forward relative rotation, torque interference during operation of an antilock braking system (ABS) is mitigated, so that the compatibility with the ABS is improved, while the traveling performance realized by the four-wheel drive is maintained.

When an accelerator pedal is depressed and released during a turn on a low-$\mu$ road, the direction of relative rotation between the housing 13 and the rotary shaft 14 reverses. In such a case, the internal pressure generated in the pressure chamber 23 due to flow of the viscous fluid 27 decreases to some extent while the air mixed in the viscous fluid 27 moves within the pressure chamber 23 in accordance with the pressure profile generated in the pressure chamber 23. Accordingly, in a conventional drive force transmission apparatus, rising of torque with an initial increase in the rotational-speed difference (illustrated by the broken line in FIG. 11) becomes dull as indicated by the solid line A in FIG. 11.

Figure 10A:
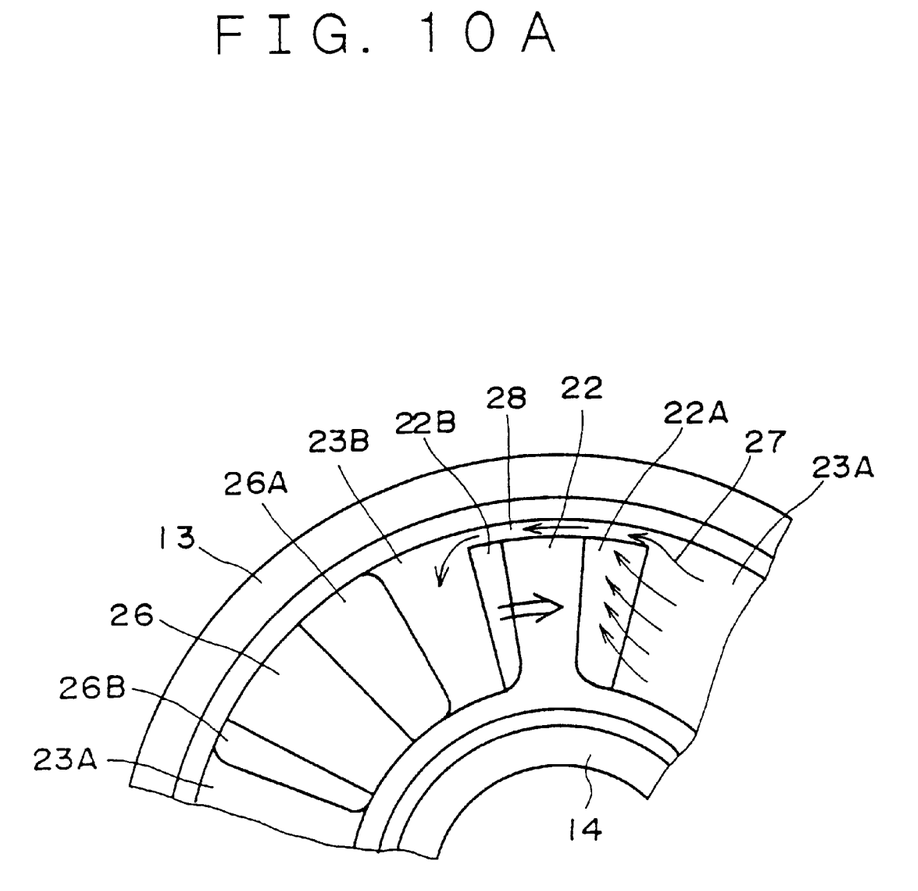
FIG. 10 is a sectional view showing an operating state of the drive force transmission apparatus according to the third embodiment.
Figure 10B:
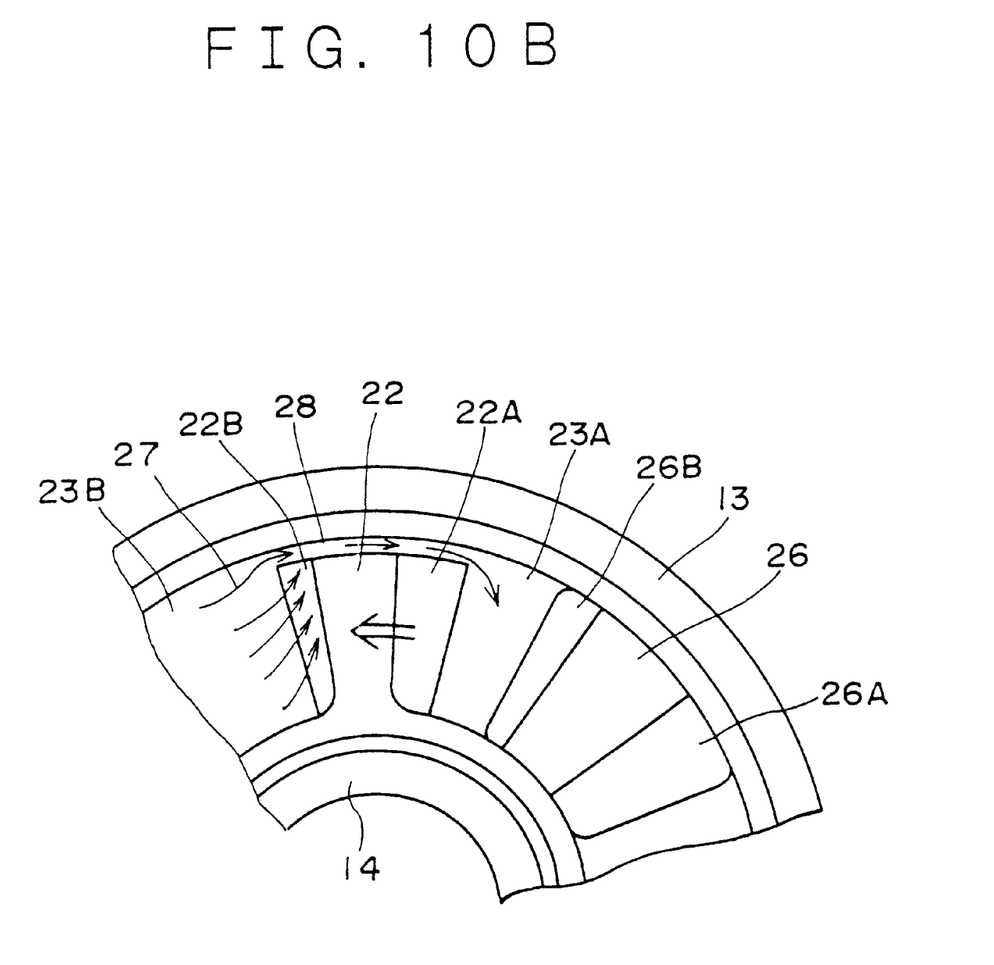

However, in the present embodiment, when the direction of rotation of the rotary shaft 14 relative to the housing 13 reverses, a speed difference is produced between the rotary blades 22 and the free blades 26 due to the effect of inertia, so that the free blades 26 move apart from the rotary blades 22, as shown in FIG. 10A. As a result, the volumes of the pressure chambers 23A formed between the rotary blades 22 and the free blades 26 decrease, with the result that the internal pressures of the pressure chambers 23A increase in accordance with variations in the volumes.

At this time, as shown in FIG. 10A, the viscous fluid 27 flows from one pressure chamber 23A to the other pressure chamber 23B along the longer stepped potion 22A of each rotary blade 22 and via the corresponding clearance 28. Therefore, the action of the free blades 26 for increasing the pressures generated within the pressure chambers 23 is enhanced.

In contrast, when the direction of relative rotation reverses from the forward direction to the reverse direction, the viscous fluid 27 flows from the pressure chamber 23B to the pressure chamber 23A along the shorter stepped portion 22B of each rotary blade 22 and via the corresponding clearance 28. Therefore, the action of the free blades 26 for increasing the pressures generated within the pressure chambers 23 is suppressed.

Figure 11:
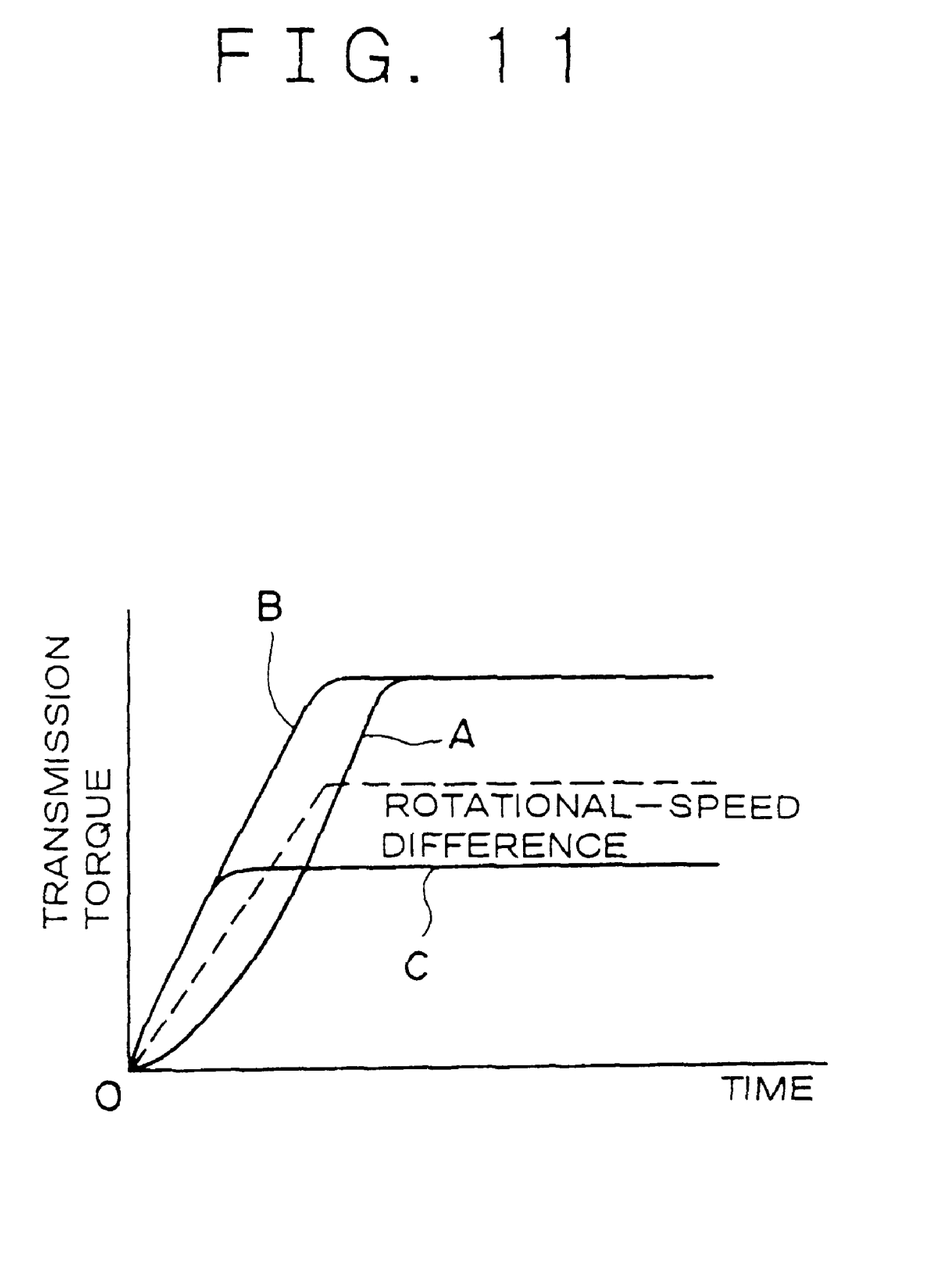
FIG. 11 is a graph showing torque transmission characteristics of the drive force transmission apparatus according to the third embodiment.

Accordingly, while air mixed in the viscous fluid 27 moves within the pressure chambers 23, the reduction of the internal pressure of the pressure chambers 23 caused by the flow of the viscous fluid 27 is compensated through the reduction of the volumes of the pressure chambers 23, which occurs due to the speed difference between the rotary blades 22 and the free blades 26. Thus, rising of torque with an initial increase in the rotational-speed difference is improved from the solid line A in FIG. 11 to the solid line B in FIG. 11, so that the responsiveness during reversion of the direction of relative rotation can be improved. The solid line C in FIG. 11 shows the transmission characteristics during the reverse relative rotation.

When the reversed relative rotation between the housing 13 and the rotary shaft 14 continues, the rotary blades 22 abut the free blades 26, so that the free blades 26 starts integral rotation with the rotary blades 22. Thus, the drive force transmission apparatus returns to the ordinary state in which an internal pressure proportional to the rotational-speed difference is generated within each pressure chamber 23 due to the viscous friction effect of the viscous fluid 27 caused by the relative rotation between the housing 13 and the rotary shaft 14.

In the above-described drive force transmission apparatus, when the direction of rotation of the rotary shaft 14 relative to the housing 13 reverses, the volumes of the pressure chambers 23 decrease due to relative movement between the rotary blade 22 and the additionally provided free blades 26, so that the pressures within the pressure chambers 23 increase.

Accordingly, when the direction of relative rotation reverses, a pressure is generated due to the viscous friction of the viscous fluid 27 caused by the relative rotation between the housing 13 and the rotary shaft 14, and the thus-generated pressure is increased by the relative movement of the free blades 26 with respect to the rotary blades 22. Thus, the responsiveness during reversion of the relative rotation can be improved.

In addition, since the stepped portions 22A and 22B having different lengths in the rotational direction are formed on the circumferentially opposite ends of each rotary blade 22, and the stepped portions 26A and 26B having different lengths in the rotational direction are formed on the circumferentially opposite ends of each free blade 26, an increase in the pressure generated in the pressure chamber 23 during the reversed relative ration can be suppressed. Accordingly, the compatibility of the drive force transmission apparatus with the ABS can be improved.

In the present embodiment, the front housing 13, the multiple disc clutch 17, the piston 16, the space 20, and the rear housing 19 are arranged in this sequence in the drive force transmission apparatus. However, the reversed arrange may be employed. That is, the drive force transmission apparatus may be constructed such that the front housing 13, the space 20, the piston 16, the multiple disc clutch 17, and the rear housing 19 are disposed in this sequence.

In the present embodiment, the plurality of separated and independent free blades 26 are disposed in the pressure chambers 23. However, the structure of the present embodiment may be modified such that a free rotor 25 is rotatably fitted into the rotor 21 concentrically therewith, and the plurality of free blades 26 are projected from the free rotor 25 at constant angular intervals in the circumferential direction.

In the present embodiment, the stepped portions 22A and 22B having different lengths in the rotational direction are formed on the circumferentially opposite ends of each rotary blade 22, and the stepped portions 26A and 26B having different lengths in the rotational direction are formed on the circumferentially opposite ends of each free blade 26. However, the shorter stepped portions 22B and 26B may be omitted.

Since the steeped portions of the rotary blades 22 and the free blades 26 serve to change the pressure generated in the pressure chambers 23 in accordance with the direction of relative rotation, the compatibility with the ABS can be improved.

Obviously, numerous modifications and variations of the present invention are possible in light of the above teachings. It is therefore to be understood that within the scope of the appended claims, the present invention may be practiced otherwise than as specifically described herein.

What is claimed is:

1. A drive force transmission apparatus comprising:
   a housing connected to one of two shafts that are rotatable relative to each other;
   a rotary shaft rotatably supported by said housing and connected to the other shaft;
   a multiple disc clutch composed of a plurality of outer plates engaged with said housing in the rotational direction and a plurality of inner plates engaged with said rotary shaft in the rotational direction, said multiple disc clutch transmitting rotational torque between said housing and said rotary shaft through frictional engagement between the outer plates and the inner plates; and
   pressure generation means for generating a pressure corresponding to a rotational-speed difference between said housing and said rotary shaft and for applying the generated force to said multiple disc clutch via a piston, wherein said pressure generating means comprises:
      a plurality of rotary blades accommodated within a cylindrical space formed between said piston and said housing, said blades arranged in the circumferential direction and rotating together with said rotary shaft;
      a viscous fluid charged into a plurality of pressure chambers defined by said housing, said piston, and said rotary blades; and
      a free blade accommodated within at least one pressure chamber, said free blade being freely movable in the circumferential direction between said rotary blades.

2. A drive force transmission apparatus according to claim 1, wherein a plurality of said free blades are radially projected from a free rotor which is rotatably supported in concentric with said rotary blades.

3. A drive force transmission apparatus according to claim 1, wherein a plurality of said free blades are accommodated within said pressure chambers such that each free blade can be independently moved relative to and between said rotary blades in the circumferential direction.

4. A drive force transmission apparatus according to claim 1, wherein a stepped portion is formed at least at one end of each of said rotary blades and one end of said free blade in the rotational direction.

5. A drive force transmission apparatus according to claim 4, wherein stepped portions having different lengths in the rotational direction are respectively formed at opposite ends of each of said rotary blades and said free blade in the rotational direction.

6. A drive force transmission apparatus according to claim 5, wherein the longer stepped portion of each rotary blade and the longer stepped portion of the free blade are formed on the same circumferential sides with respect to said rotary blades and said free blade, respectively.

7. A drive force transmission apparatus according to claim 6, wherein a plurality of said free blades are radially projected from a free rotor which is rotatably supported in concentric with said rotary blades.

8. A drive force transmission apparatus according to claim 6, wherein a plurality of said free blades are accommodated within said pressure chambers such that each free blade can be independently moved relative to and between said rotary blades in the circumferential direction.

* * * * *